United States Patent
Warth et al.

(10) Patent No.: US 7,954,994 B2
(45) Date of Patent: Jun. 7, 2011

(54) COMBINED PRESSURE/TEMPERATURE SENSOR HAVING CENTRIC TEMPERATURE MEASUREMENT

(75) Inventors: Stefan Warth, Ditzingen (DE); Oliver Stoll, Reutlingen (DE); Christian Roesser, Grossbottwar (DE); Markus Ledermann, Asperg (DE); Joerg Engelhardt, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 312 days.

(21) Appl. No.: 12/088,995

(22) PCT Filed: Nov. 9, 2006

(86) PCT No.: PCT/EP2006/068255
§ 371 (c)(1),
(2), (4) Date: Sep. 8, 2008

(87) PCT Pub. No.: WO2007/062968
PCT Pub. Date: Jun. 7, 2007

(65) Prior Publication Data
US 2009/0041081 A1 Feb. 12, 2009

(30) Foreign Application Priority Data
Nov. 29, 2005 (DE) .......................... 10 2005 056 762

(51) Int. Cl.
G01K 1/00 (2006.01)
G01K 13/00 (2006.01)
G01L 7/08 (2006.01)
G01L 19/04 (2006.01)

(52) U.S. Cl. ............ 374/143; 374/208; 73/715; 73/756; 73/726; 73/708

(58) Field of Classification Search .................. 374/143, 374/208; 73/715, 756, 726, 708
See application file for complete search history.

(56) References Cited

U.S. PATENT DOCUMENTS 5,070,706 A * 12/1991 Waters et al. .................... 62/129
5,578,993 A * 11/1996 Sitabkhan et al. ............ 340/614
(Continued)

FOREIGN PATENT DOCUMENTS
DE 19745244 4/1998
(Continued)

OTHER PUBLICATIONS

International Search Report, PCT International Patent Application No. PCT/EP2006/068255, dated Mar. 14, 2007.

*Primary Examiner* — Lisa M Caputo
*Assistant Examiner* — Mirellys Jagan
(74) *Attorney, Agent, or Firm* — Kenyon & Kenyon LLP

(57) ABSTRACT

A combined pressure and temperature sensor for recording the pressure and the temperature of a medium. The combined pressure and temperature sensor includes a sensor element in which at least one channel is developed for accommodating a temperature sensor and at least one channel is developed for recording a pressure. The at least one channel, for recording a pressure, opens out under a pressure sensor. The at least one channel for the temperature sensor runs centrically in the sensor element.

11 Claims, 2 Drawing Sheets

U.S. PATENT DOCUMENTS

| | | | | |
|---|---|---|---|---|
| 5,677,493 | A | * | 10/1997 | Yamamoto et al. ............. 73/727 |
| 5,975,842 | A | * | 11/1999 | Jensen et al. .................. 415/118 |
| 6,062,087 | A | * | 5/2000 | Vovan ............................. 73/726 |
| 6,267,010 | B1 | * | 7/2001 | Hatanaka et al. ............... 73/756 |
| 6,588,222 | B1 | | 7/2003 | Urbank et al. |
| 7,302,805 | B2 | | 12/2007 | Tille et al. |
| 2003/0221302 | A1 | * | 12/2003 | Moyer et al. ................. 29/25.35 |
| 2004/0016251 | A1 | | 1/2004 | Street et al. |
| 2007/0121701 | A1 | * | 5/2007 | Gennissen et al. ........... 374/143 |
| 2007/0186659 | A1 | * | 8/2007 | Engelhardt et al. ............. 73/708 |

FOREIGN PATENT DOCUMENTS

| | | |
|---|---|---|
| DE | 10109095 | 9/2002 |
| DE | 10232315 | 5/2003 |
| EP | 1101639 | 5/2001 |
| EP | 1457676 | 9/2004 |
| EP | 1521061 | 4/2005 |
| FR | 2691802 A1 * | 12/1993 |

* cited by examiner

COMBINED PRESSURE/TEMPERATURE SENSOR HAVING CENTRIC TEMPERATURE MEASUREMENT

BACKGROUND INFORMATION

Air conditioning systems installed in vehicles in the future will be $CO_2$ air conditioning systems, since, according to EU legislation, the refrigerants R134a, that have been used in vehicle air conditioning systems, will be prohibited by the year 2016.

By contrast to conventional air conditioning systems for vehicles, in which the refrigerant R134a is used, in $CO_2$ air conditioning systems both a pressure signal and a temperature signal are required after the compressor for regulation. The use of two separate sensors to record the pressure signal and to record the temperature signal would involve very great expenditure, and this is why an attempt is made to record the two signals named using a single sensor, a combined pressure and temperature sensor.

Combined pressure and temperature sensors are described, for example, in European Patent No. EP 1 521 061 A1, and German Patent Application Nos. DE 101 09 095 A1 and DE 197 45 244 A1.

In the design approach described in German Patent Application No. DE 101 09 095 A1, a front diaphragm sensor is used having a mounted plunge sensor. However, this concept is very sensitive in the diaphragm area, so that a protective screen has to be inserted. This solution would be designed more for sport racing applications, and therefore involves an extremely short service life.

According to design approach described in German Patent Application No. DE 197 45 244 A1, a separate threaded part is used for the temperature sensor, which is sealed using an O-ring. This concept is rather complex and costly, and is therefore not suitable for mass production. In using an O-ring as sealing element, one should consider that the O-ring, which is an elastomer component, in general tends to become brittle when applied in air conditioning systems, in which lower temperature may definitely be expected, and the sealing effect of the O-ring will deteriorate considerably over the life of the air conditioning system, so that leakages may occur.

German Patent Application No. DE 102 32 315 A1 describes a combined temperature and pressure sensor and a method for ascertaining physical characteristics variables. The combined temperature and pressure sensor described in German Patent Application No. DE 102 32 315 A1 is of the type that is able to be used in fluid systems. In a common base element there is situated at least one channel, the base element being fastened in an opening in a wall, in a pressure-tight manner. In the base element that is developed essentially in a rotationally symmetrical way, a pressure measuring channel is situated straight-through centrically, in the base element, approximately parallel to the pressure measuring channel, at least one temperature measuring channel is situated in an eccentric manner, and the pressure-tight fastening of the base element is developed detachably in the opening of the wall. The end region of the pressure measuring channel, facing away from the wall, runs in a sleeve-shaped elongation of the base element, which is further removed from the wall than the end of the temperature measuring channel facing away from the wall. At the end of the elongation facing away from the wall, there is a pressure sensor having a diaphragm.

A disadvantage of the concepts named above is that the temperature measurement in the combined pressure and temperature sensors introduced there takes place eccentrically. This has the result that the temperature measurement becomes less accurate and in addition, that it depends on the installation position of the temperature sensor.

SUMMARY

An object of the present invention is to provide as simple as possible a solution, that is suitable for mass production, for a combined pressure and temperature sensor in which, in particular, a centric position of the temperature sensor is realized which makes possible a very accurate temperature measurement.

In accordance with one design approach according to the present invention, a combined pressure and temperature sensor is provided in whose sensor element, that is able to be developed in single part or multipart form, is a concentric channel for accommodating a temperature sensor. The channel for accommodating the temperature sensor that runs centrically in the single part or multipart designed sensor element is sealed at a media-facing side of the single part or multipart sensor element, using a cover having a centrically designed, dome-shaped extension piece. In this dome-shaped extension piece developed in the cover, a heat-conductive sealing material may be accommodated to improve heat conduction, in which the head of the temperature sensor is embedded.

In this first embodiment variant of the combined pressure and temperature sensor, there are channels that transmit the pressure of the medium on both sides of the center of the single part or multipart sensor element and transmit the pressure to a diaphragm situated on the side of the sensor element facing away from the media, which is preferably developed as a ring diaphragm. The ring diaphragm that is mounted on the side of the sensor element facing away from the media, and may, for instance, be welded on, includes an opening in its center, through which the contacts of the temperature sensor, that is situated at the center of the single part or multipart sensor element are led.

Instead of two pressure channels running next to the centrically developed channel for accommodating the temperature sensor, a plurality of pressure channels may also be inserted into the single part or multipart sensor element, which enclose the centrically designed channel for accommodating the temperature sensor in an annular manner.

Besides having a single part type of construction, the sensor element may also, for instance, be made up of two pipes arranged concentrically to each other, the hollow space of the inner pipe being able to be used for accommodating the temperature sensor.

In a further variant of the embodiment of the combined pressure and temperature sensor provided according to the present invention, the sensor element is pipe-shaped, and a diaphragm for recording the pressure is fastened inside the pipe-shaped sensor element, the diaphragm for recording the pressure having a recess that runs in an annular manner. This weakens the material strength of the diaphragm. Above this weakened zone formed by the annular recess, Si strain gauges may be applied, for recording a pressure signal when pressure is applied to the diaphragm by the pressure of the medium which acts on the diaphragm in a pressure chamber. In this variant of the embodiment, the cover in which the temperature sensor is accommodated centrically with respect to the pipe-shaped sensor element, is fastened at the lower side of the diaphragm, which has a centric opening for the temperature sensor. The cover, which forms a dome-shaped extension piece at the under side of the diaphragm may be developed in different lengths and be adjusted in such a way that the head of the temperature sensor is brought centrically as far as possible into the medium whose temperature is to be recorded. The cover that forms the dome-shaped extension piece may, as was mentioned above, be fastened thermally at the under side of the diaphragm fastened in the pipe-shaped sensor element. However, the diaphragm may also be designed so that it forms one component with the dome-shaped extension piece for the centrical accommodation of the temperature sensor.

BRIEF DESCRIPTION OF THE DRAWINGS

In the following text, the present invention will be explained in greater detail below.

FIG. 1.1 shows a section through the sensor element according to section pattern I.I to I.I in FIG. 1.

FIG. 1.2 shows a section pattern according to I.II to I.II in FIG. 1, through the diaphragm developed as a ring diaphragm.

FIG. 1.3 shows a section through the sensor element that is developed having a plurality of pressure channels, which surround the centrical channel for the accommodation of the temperature sensor.

FIG. 1.4 shows one embodiment variant of the sensor element, constructed of two pipes arranged concentrically to each other.

DETAILED DESCRIPTION OF EXAMPLE EMBODIMENTS

Figure 1:
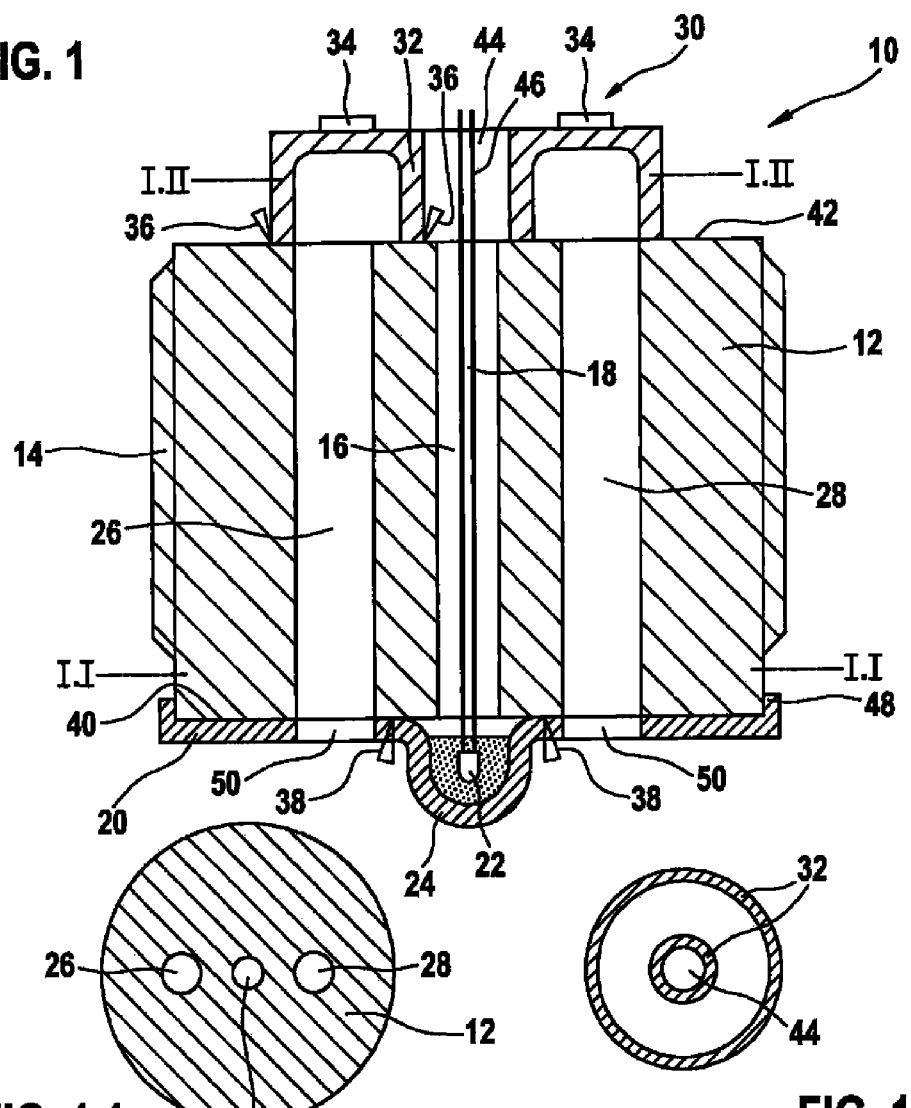
FIG. 1 shows a section through an example embodiment of the combined pressure and temperature sensor according to the present invention, having a diaphragm developed as a ring diaphragm and a cover provided at a side of the sensor element facing the media, in which the temperature sensor ends, that is centrically arranged in the sensor element.

FIG. 1 shows a first embodiment variant of the combined pressure and temperature sensor provided according to the present invention.

The first embodiment variant, shown in FIG. 1, of a combined pressure and temperature sensor 10, has a sensor element 12 at whose outer side a threaded section 14 is developed. Sensor element 12 has a centrically developed channel 16 in which a temperature sensor 18 is accommodated. Temperature sensor 18 includes a head 22 which is surrounded by a cover 20, which is accommodated at a medium-side end face 40 of sensor element 12 developed as a single part in FIG. 1. Cover 20 at medium-side end face 40 of sensor element 12 includes a dome-shaped extension piece 24. Cover 20 may with especial advantage be manufactured as a deep-drawn component, in which dome-shaped extension piece 24 is able to be developed in one working step.

On the two sides of channel 16, developed centrically in sensor element 12, for accommodating temperature sensor 18, there runs a pressure channel 26 as well as a second pressure channel 28. Pressure channels 26 and 28 are aligned with openings 50 in cover 20, which is accommodated at medium-side end face 40 of sensor element 12. The pressure of the medium is transmitted through sensor element 12 to a diaphragm 30, via openings 50 and first and second pressure channel 26, 28. Diaphragm 30 is developed as a ring diaphragm 32 in the embodiment variant according to FIG. 1, which is fastened to an end face 42, that faces away from the medium, of single part sensor 12, using continuous material joints 36. Ring diaphragm 32 is preferably a perforated diaphragm, a hole being able to be developed in it as a bulge structure. This means that the pressure-sensitive part of diaphragm 32 extends concentrically about an opening in the middle. The measurement of the extension of ring diaphragm 32 may be implemented either using onglazed Si structures 34 (Si strain gauge strips) or by a strain measurement structure in the form of a metallic thin film. By using a ring diaphragm 32 thus shaped, a contact passage 44 may be created in the middle, through which contacts 46 of temperature sensor 18 may be led out of sensor element 12 to the outside.

Head 22 of centrically arranged temperature sensor 18 is enclosed by dome-shaped extension piece 24 of cover 20. Cover 20 may be fastened, at a continuous material joint 38, to medium-side end face 40 in such a way that the hollow space of dome-shaped extension piece 24 is sealed from the pressure that is transmitted by pressure channels 26 and 28 to ring diaphragm 32. Continuous material joints 36 and 38 may be advantageously produced by laser welding in mass production, in automated fashion.

Using a centering 48, cover 20 is able to be centered at medium-side end face 40 of sensor element 12. In the hollow space of dome-shaped extension piece 24, a heat conductive sealing compound is introduced to improve the temperature coupling, and it improves the measuring accuracy of the temperature sensor. As the heat conductive sealing compound, a conductive silicon adhesive may be considered, for example, via which head 22 of temperature sensor 18 is able to be fixed in addition, within dome-shaped extension piece 24.

FIG. 1.1 shows a section according to section pattern I.I to I.I in FIG. 1.

As shown in FIG. 1.1, first pressure channel 26 and second pressure channel 28 in single part sensor element 12 run on both sides of centrically developed channel 16, for the accommodation of temperature sensor 18. The arrangement of first pressure channel and second pressure channel 26, 28 in the section according to FIG. 1.1 is obviously also able to be rotated by 90°.

FIG. 1.2 shows a section through the ring diaphragm of the combined pressure and temperature sensor according to FIG. 1 corresponding to section pattern I.II to I.II.

FIG. 1.2 shows that the diaphragm developed as ring diaphragm 32 has a contact passage 44 at end face 42 facing away from the medium. Contacts 46 of temperature sensor 18 are led to the outside through it, according to FIG. 1. The hollow space of ring diaphragm 32, seen in FIG. 1.2, has the medium applied to it via first and second pressure channels 26, 28, shown in FIG. 1 and FIG. 1.1, whose pressure is to be measured by ring diaphragm 32.

FIG. 1.3 illustrates an alternate embodiment of the pressure channels in a sensor element 12 developed as a single part.

In contrast to the sectional representation shown in FIG. 1.1, sensor element 12 may also be provided with a plurality 52 of pressure channels. In annular fashion, these surround channel 16, that is developed in the center of single part temperature sensor 12, for the accommodation of temperature sensor 18.

In the representation according to FIG. 1.4, one may see an alternative embodiment variant of the sensor element of the combined pressure and temperature sensor.

In the embodiment variant according to FIGS. 1 to 1.3, sensor element 12 is developed as a single part component. Alternatively, sensor element 12 may also be developed as a multipart component, including an inner pipe 54 and an outer pipe 56 surrounding it. By selecting different diameters for inner pipe 54 and outer pipe 56, an annular hollow space is able to be created which functions as a pressure channel and via which the pressure of the medium is able to be transferred to diaphragm 30, that is preferably developed as ring diaphragm 32. A hollow space 58 of inner pipe 54 may advantageously be utilized as channel 16 for accommodating temperature sensor 18. In the case of a multipart design of sensor element 12, inner pipe 54 is first connected in a continuous material to ring diaphragm 32, and then outer pipe 56 is also connected in a continuous material to the lower side of ring diaphragm 32. The continuous material joints mentioned are preferably developed as laser welding seams, which may be mass produced cost-effectively in automated fashion.

Figure 2:
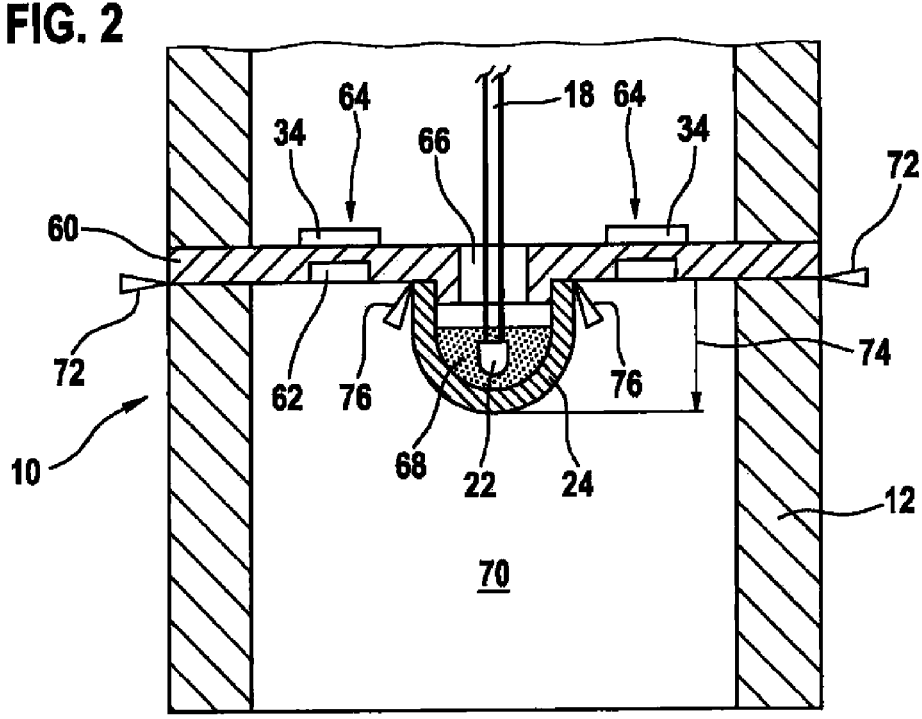
FIG. 2 shows an additional embodiment variant of the combined pressure and temperature sensor provided according to the present invention, having a diaphragm which has an annular recess, and a dome-shaped extension piece for accommodating the temperature sensor that is arranged centrically at the under side of the diaphragm.

In the representation according to FIG. 2, a second embodiment variant will be seen of the combined pressure and temperature sensor proposed according to the present invention.

It is seen in the representation according to FIG. 2 that sensor element 12 is formed by a pipe. A diaphragm 60, which is preferably a steel diaphragm, is welded onto an end face of sensor element 12, using a continuous material connection. The continuous material connection is denoted by reference numeral 72. Diaphragm 60 includes a recess 62 which runs in an annular manner, and which forms a refraction zone in the diaphragm material. Opposite annularly running recess 62, at the upper side of diaphragm 60, there are one or more strain gauge strips 34. Alternatively, the strain of diaphragm 60 may be developed as a thin film metal strain gauge, in response to the application of pressure chamber 70 that is limited by pipe-shaped sensor element 12.

On the lower side of the embodiment variant of the combined pressure and temperature sensor shown in FIG. 2, there is dome-shaped extension piece 24 as a separate component. Dome-shaped extension piece 24 is connected to the lower side of diaphragm 60 at a preferably continuous material joint 76. Continuous material joint 76 is preferably produced using a laser welding method. In dome-shaped extension piece 24, a heat conductive sealing compound 68 is provided in which head 22 of temperature sensor 18 is embedded. The contacts of temperature sensor 18 are guided to the outside by centrical opening 66 in the middle of diaphragm 60. In the representation according to FIG. 2, dome-shaped extension piece 24 has a first length 74. Reference numeral 64 denotes the position at which strain gauge strips 34 are situated on the upper side of diaphragm 60, preferably above annularly running recess 62 of diaphragm 60. Below centrical opening 66 of diaphragm 60, a centering aid in the form of a shoulder may be developed, onto which dome-shaped extension piece 24 is positioned and is subsequently able to be joined at joint 66 in continuous material to diaphragm 60, which is preferably a steel diaphragm.

First length 74 of dome-shaped extension piece 24, which determines the depth of submergence of head 22 of temperature sensor 18 into the medium whose temperature is to be measured, may naturally also be designed to be of greater length, so that dome-shaped extension piece 24, and thus also head 22, extends further into pressure chamber 70, and thus dips more deeply into the medium washing around dome-shaped extension piece 24. Besides being used for fastening dome-shaped extension piece 24 at the centering aid below centering opening 66, continuous material joint 76 is also used for sealing the inner space of dome-shaped extension piece 24 from the pressure prevailing in pressure chamber 70, and encapsulates against it temperature sensor 18 inclusive of head 22.

Figure 3:
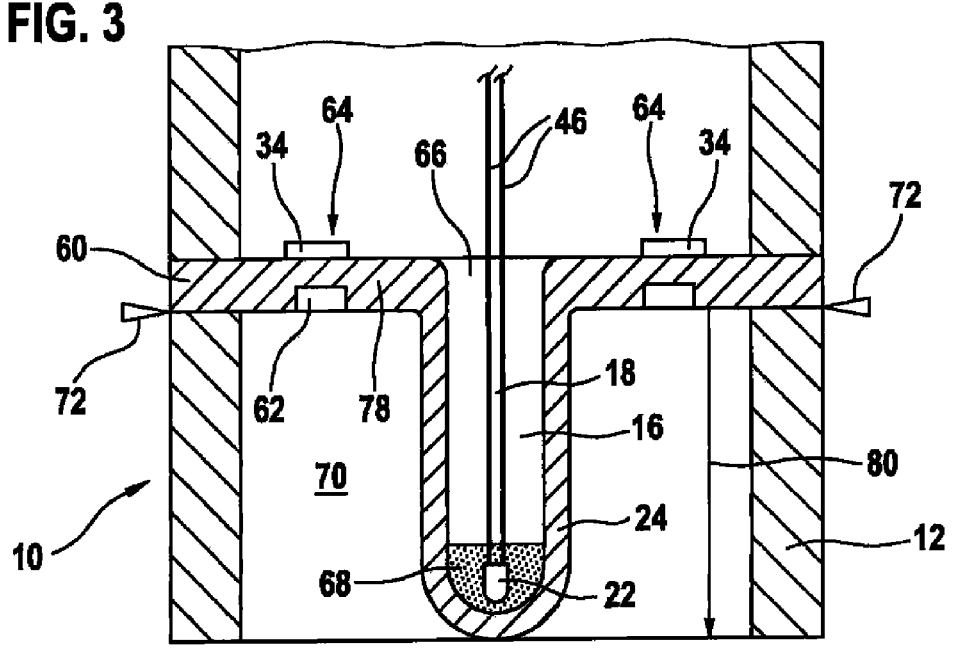
FIG. 3 shows an additional embodiment variant of the pressure and temperature sensor provided according to the present invention, in which a channel for the centrical accommodation of the temperature sensor is developed in the diaphragm.

FIG. 3 shows a third embodiment variant of the combined pressure and temperature sensor provided according to the present invention.

It may be seen in the illustration according to FIG. 3 that in this embodiment variant, too, sensor element 12 is pipe-shaped. At first joint 72 diaphragm 60 is connected by continuous material to pipe-shaped sensor element 12. In this embodiment variant, too, diaphragm 60 includes an annular recess 62 on its side facing pressure chamber 70, which represents a weakening of the material strength of diaphragm 60. Above recess 62 that runs annularly on the under side of diaphragm 60, strain gauges 34 are located on the upper side of diaphragm 60 in position 64. By contrast to the embodiment variant of diaphragm 60 shown in FIG. 2, in diaphragm 60 dome-shaped extension piece 24 is developed as one component part. In its individual piece construction shown in FIG. 3, diaphragm 60 may be manufactured by way of a deep-drawing method, a reduced wall strength setting in in the region of dome-shaped extension piece 24. It is seen in the illustration according to FIG. 3 that dome-shaped extension piece 24 in diaphragm 60 has a second length 80 in this embodiment variant. Because of this, head 22 of temperature sensor 18, that is accommodated within dome-shaped extension piece 24, lies very far in pressure chamber 70, and therefore it is immersed very far into the medium, whose pressure, on the one hand, and temperature, on the other hand, are to be recorded. Head 22 of temperature sensor 18 is accommodated in a sealing compound that is heat conductive and improves the thermal coupling to the wall of dome-shaped extension piece 24. Heat conductive sealing compound 68 additionally has the task of fixing head 22 and parts of temperature sensor 18 within the hollow space of dome-shaped extension piece 24, that is, within channel 16 for accommodating temperature sensor 18, that is formed by it.

In the embodiment variant of the combined pressure and temperature sensor shown in FIG. 3, the additional centering piece, shown in FIG. 2 on the lower side of opening 66, for passing through contacts 64 of temperature sensor 18, may be omitted. Contacts 46 of temperature sensor 18 are brought out from channel 16, in which temperature sensor 18 is accommodated, on the side facing away from pressure chamber 70.

Both contacts 46 of temperature sensor 18 and the lead connectors by which strain gauges 34 are recorded on the side of diaphragm 60 facing away from the pressure, are connected to an evaluation electronics system that is not shown in FIGS. 1 to 3, by which a compressor for a $CO_2$ air conditioning system is regulated.

It is common to all the embodiment variants, described above, of combined pressure and temperature sensor 10, provided according to the present invention, that temperature sensor 18 is accommodated centrically in it. This improves the accuracy of the temperature recording, and the measurement of the temperature of the medium washing about temperature sensor 18, or rather its head 22, becomes independent of the position of temperature sensor 18, when combined pressure and temperature sensor 10 is screwed into a line carrying the medium. The design approach according to the present invention also offers the advantages of a rapid response time of temperature sensor 18 as well as reliable measurement, especially if head 22 of temperature sensor 18 extends far into the medium.

The embodiment variants of combined pressure and temperature sensor 10, provided according to the present invention that are shown in FIGS. 1 to 3 also offer the advantage that they are easily manufactured in mass production. In the embodiment variant shown in FIG. 1 it should particularly be emphasized that cover 20, together with dome-shaped extension piece 24, may be very cost-effectively made as a deep-drawn component, and the accommodation of head 22 of temperature sensor 18 is implemented using one and the same component part, and sealing of the hollow space of dome-shaped extension piece 24 from the pressure of the medium is achieved by thermal joint 68. In the embodiment variant shown in FIG. 3, it should particularly be emphasized that the construction of combined pressure and temperature sensor 10 shown in FIG. 3 is very simple if diaphragm 60 is manufactured as a deep-drawn component, in which dome-shaped extension piece 24 is able to be developed in one work step, in a manner corresponding to the immersion depth into the medium. At this point we should emphasize the simple bringing out of contacts 46 from channel 16 for the accommodation of temperature sensor 18. In the embodiment variant shown in FIG. 3, the construction of sensor element 12, to which deep-drawn diaphragm 60 may be connected very simply along an annularly running thermal joint 72, is particularly simple.

The invention claimed is:

1. A combined pressure and temperature sensor, comprising:
   a sensor element including a pressure sensor, at least one first channel adapted to accommodate a temperature sensor, and at least one second channel adaptable for recording a pressure, the at least one second channel opening below the pressure sensor;
   wherein:
   the at least one first channel adapted to accommodate the temperature sensor runs centrically in the sensor element; and
   the pressure sensor:
   is designed as a diaphragm; and
   includes a centrically situated opening for a temperature sensor, which is enclosed by a dome-shaped extension piece that is connected by continuous material to the pressure sensor.

2. The combined pressure and temperature sensor as recited in claim 1, wherein the temperature sensor is enclosed at one medium-side end face of the sensor element by a centrically developed, dome-shaped extension piece of a cover.

3. The combined pressure and temperature sensor as recited in claim 1, wherein the at least one second channel includes a plurality of channels adapted for recording pressure.

4. The combined pressure and temperature sensor as recited in claim 1, wherein the pressure sensor includes a recess that runs annularly on a side facing a pressure chamber.

5. The combined pressure and temperature sensor as recited in claim 1, wherein the dome-shaped extension piece is developed by deep-drawing in a center of the diaphragm.

6. The combined pressure and temperature sensor as recited in claim 1 wherein the dome-shaped extension piece is able to be developed in different lengths that define an immersion depth of the temperature sensor into the medium.

7. The combined pressure and temperature sensor as recited in claim 1, wherein the temperature sensor is embedded in a heat conductive sealing compound on a side facing a medium.

8. The combined pressure and temperature sensor as recited in claim 1, wherein the temperature sensor is accommodated in a channel, developed as a bore of the sensor element or in a hollow space of an inner pipe of a multipart sensor element.

9. The combined pressure and temperature sensor as recited in claim 8, wherein the sensor element is a multipart sensor element component, the temperature sensor is accommodated in a hollow space of an inner pipe of the multipart sensor element component, and, between the inner pipe and an outer pipe of the multipart sensor element component, an annular pressure chamber is formed.

10. The combined pressure and temperature sensor as recited in claim 1, wherein the diaphragm include at least one strain gauge strip at a side facing away from the medium.

11. The combined pressure and temperature sensor as recited in claim 10, wherein the diaphragm is a ring diaphragm.

* * * * *